US00RE41699E

(19) United States
(12) Reissued Patent
Itano et al.

(10) Patent Number: US RE41,699 E
(45) Date of Reissued Patent: Sep. 14, 2010

(54) ELECTRICAL CONNECTOR JACK

(75) Inventors: Michael M. Itano, Seattle, WA (US); William D. Regester, Bothell, WA (US); John M. Redfield, Brier, WA (US)

(73) Assignee: Leviton Manufacturing Co., Inc., Little Neck, NY (US)

(21) Appl. No.: 11/264,810

(22) Filed: Nov. 1, 2005

Related U.S. Patent Documents

Reissue of:
(64) Patent No.: 6,641,443
Issued: Nov. 4, 2003
Appl. No.: 10/261,165
Filed: Sep. 27, 2002

(51) Int. Cl.
*H01R 24/00* (2006.01)

(52) U.S. Cl. ..... 439/676; 439/839
(58) Field of Classification Search ..... 439/676, 439/839, 620.11, 620.17, 620.23, 941, 592
See application file for complete search history.

(56) References Cited

U.S. PATENT DOCUMENTS 5,299,956 A 4/1994 Brownell et al.
5,310,363 A 5/1994 Brownell et al.
5,425,658 A 6/1995 White
5,431,584 A 7/1995 Ferry
5,470,244 A 11/1995 Lim et al.
5,513,065 A 4/1996 Caveney et al.
5,586,914 A 12/1996 Foster, Jr. et al.
6,409,547 B1 6/2002 Reede

*Primary Examiner*—Gary F. Paumen
(74) *Attorney, Agent, or Firm*—Davis Wright Tremaine LLP; George C. Rondeau, Jr.; Heather M. Colburn

(57) ABSTRACT

A connector jack usable with a plug having a plurality of plug contacts. The jack includes a body having a receptacle sized and configured to receive the plug therein, a circuit board, and a plurality of contact tines extending within the receptacle. Each tine has a first end fixedly attached to the circuit board and a second free end, and is positioned in the receptacle for contact by a corresponding one of the plug contacts and moved in response thereto in a first direction as the plug is inserted into the receptacle. The jack also includes a plurality of resilient spring members extending within the receptacle, each positioned adjacent to a corresponding one of the tines to be engaged thereby when moved in the first direction by the corresponding plug contact as the plug is inserted into the receptacle, and apply a supplemental force thereto to increase contact force and tine resiliency.

30 Claims, 5 Drawing Sheets

ELECTRICAL CONNECTOR JACK

Matter enclosed in heavy brackets [ ] appears in the original patent but forms no part of this reissue specification; matter printed in italics indicates the additions made by reissue.

BACKGROUND OF THE INVENTION

The Category 6 jack is a receptacle that accepts a Category 6 plug, and is frequently used to electrically interconnect telecommunication equipment. There are several standards that dictate how the Category 6 jack is constructed and performs. Two of which are TIA/EIA (Telecommunications Industry Association/Electronic Industries Alliance) 568 B and FCC (Federal Communication Commission) part 68. The TIA standard is largely a cabling standard to allow for proper installation and performance criteria. The FCC standard is a legal standard that dictates physical characteristics of the plug and jack, such as form factor.

To meet jack performance requirements as dictated by the TIA standard, the tines of the jack must be as short as possible. To provide satisfactory electrical characteristics for the Category 6 jack, it is best that the tines be as short as possible. However, the shorter the tines the less resiliency will be demonstrated by the tines. This can create a problem when mating the Category 6 jack with a non-Category 6 plugs as required by the TIA standard discussed below.

In particular, the TIA standard requires the Category 6 jack be usable with legacy plugs (e.g., 6 position wide-2 contact plates or 6P-2C, 6 position wide-6 contact plates or 6P-6C, and so on). Such use can occur during testing after installation of Category 6 jacks when a test meter having an RJ-11 style plug (6P-4C) is plugged into one of the Category 6 jacks. Also, such use can occur when using a Category 6 jack to receive other style plugs, such as a typical phone plug (6P-2C) used for voice transmissions. When using these legacy plugs with the Category 6 jack, some of the tines of the jack encounter large amounts of deflection. While the tines of a Category 6 jack receiving a Category 6 plug usually experience a relatively small deflection, use of a legacy plug with the Category 6 jack may result in a much larger deflection. This is because the older style plugs do not have cut outs where there would be a recessed conductive plate or opening on an RJ45 style plug (Category 5, 5e or 6). However, to provide sufficient resiliency of the tines to allow such a large amount of deflection without permanent deformation, the tines must have a length so long that electrical performance is degraded.

The FCC standard specifies that the contact force between the Category 6 jack and plug when mated be a minimum of 100 grams (0.22 pounds). This is largely to ensure good electrical contact between the plug and the jack. If the Category 6 jack has tines long enough to provide the resiliency needed to accommodate legacy plugs without deformation, as discussed above, providing the necessary contact force becomes a problem since increasing the resiliency of the tine tends to cause the tine to generate lower contact force with the plug contact. The increased length also degrades electrical performance.

As such, it is desirable to provide a Category 6 jack with tines as short as possible to improve electrical performance of the jack, while still providing the resiliency to accommodate legacy plugs and the contact force needed to meet the TIA and FCC standards.

FIELD OF THE INVENTION

This invention relates to an electrical connector, and in particular, to a jack used for telecommunication equipment.

BRIEF SUMMARY OF THE INVENTION

The present invention is embodied in a connector jack usable with a plug having a plurality of plug contacts. The jack includes a body having a receptacle sized and configured to receive the plug therein, a plurality of contact tines, each having a contact portion within the receptacle positioned to be engaged by a corresponding positioned one of the plug contacts when the plug is inserted into the receptacle, and a plurality of resilient spring members. Each of the spring members is configured to apply a reaction force to one of the contact tines when engaged by the correspondingly positioned plug contact in a direction to generate a supplemental contact force between the contact tine and the correspondingly positioned plug contact.

In the illustrated embodiment, the contact tines each having a first side and an opposite second side, with the first side of each contact tine having a contact portion within the receptacle positioned to be engaged by the correspondingly positioned one of the plug contacts when the plug is inserted into the receptacle. Each spring member is positioned adjacent to the second side of a correspondingly positioned one of the contact tines. The spring members each have at least a portion positioned within the receptacle and adjacent to the second side of the correspondingly positioned one of the contact tines.

In the illustrated embodiment, each spring member is configured to apply a force against the corresponding contact tine when in a deflected position sufficient to at least assist in moving the corresponding contact tine to a return position when the plug is removed from the receptacle.

Other features and advantages of the invention will become apparent from the following detailed description, taken in conjunction with the accompanying drawings.

DETAILED DESCRIPTION OF THE INVENTION

Figure 1:
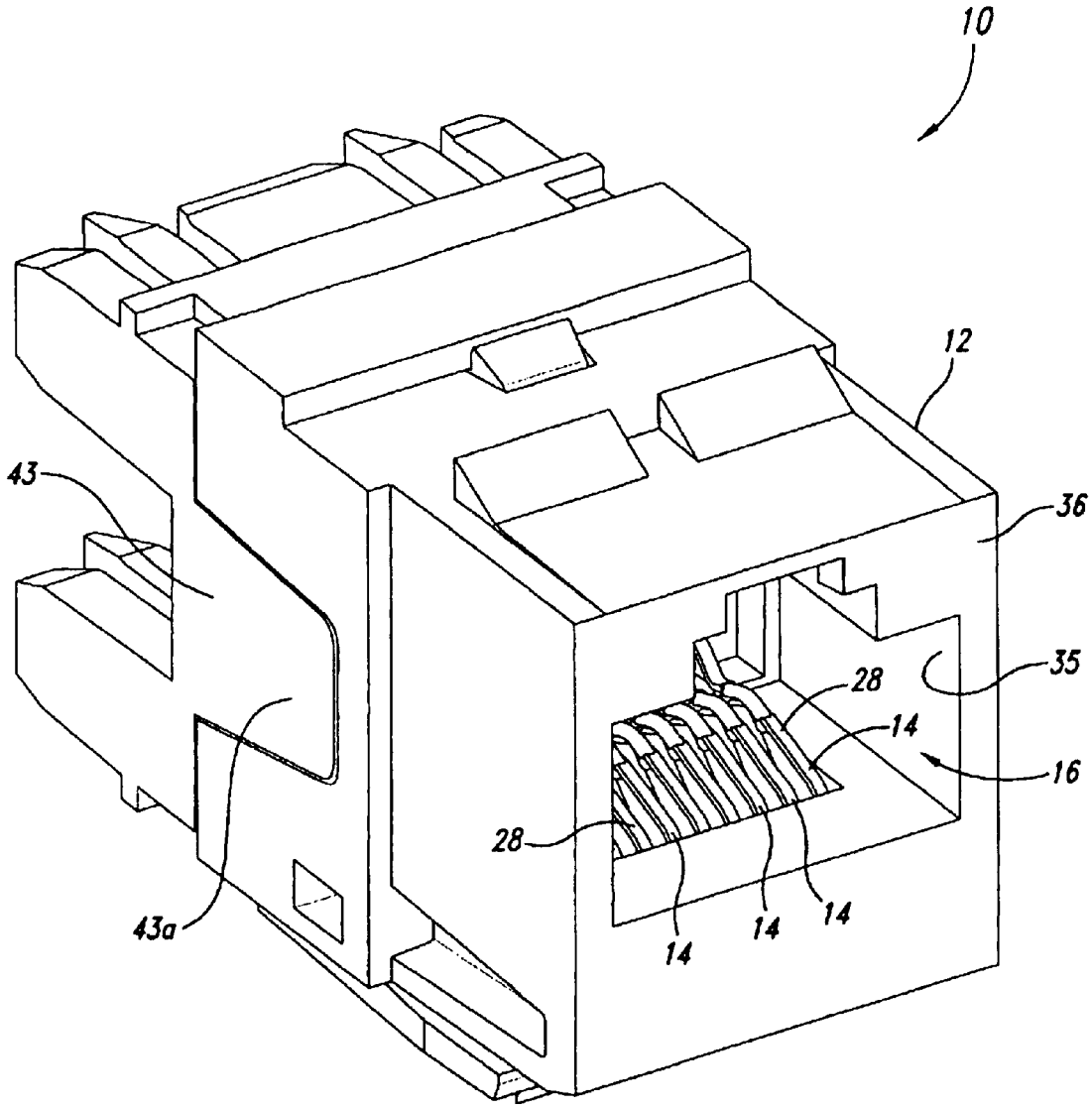
FIG. 1 is an isometric view of an electrical connector jack embodying the present invention.

An embodiment of a Category 6 RJ series electrical connector jack 10 of the present invention is illustrated in FIG. 1 fully assembled and ready for use. The jack 10 includes a dielectric housing or body 12 and a plurality of resilient contact tines 14 in parallel arrangement within an interior receptacle 16 of the body. The tines 14 may be spring wires with round or other cross-sectional shapes, elongated contact plates or have other suitable contact tine constructions. In the illustrated embodiment, eight tines 14 are used, but a fewer or greater number may be used as desired for the style connector while utilizing the principals of the invention. The body 12 is typically formed of plastic, and the tines 14 are formed of a conventional phosphor bronze metal used for Category 6 jacks and other style jacks. The receptacle 16 is sized and configured to receive a Category 6 plug 18 of conventional design, shown in cross-section in FIG. 4 inserted into the receptacle. The plug 18 has a plurality of metal conductive plates or contacts 20 which when the plug is inserted into the receptacle 16 are in contact with corresponding ones of the tines 14. The plug 18 generally has two to eight contacts 20. As noted above, other style plugs may be inserted into the receptacle 16 and those plugs may have a variety of different numbers of contacts.

Figure 2:
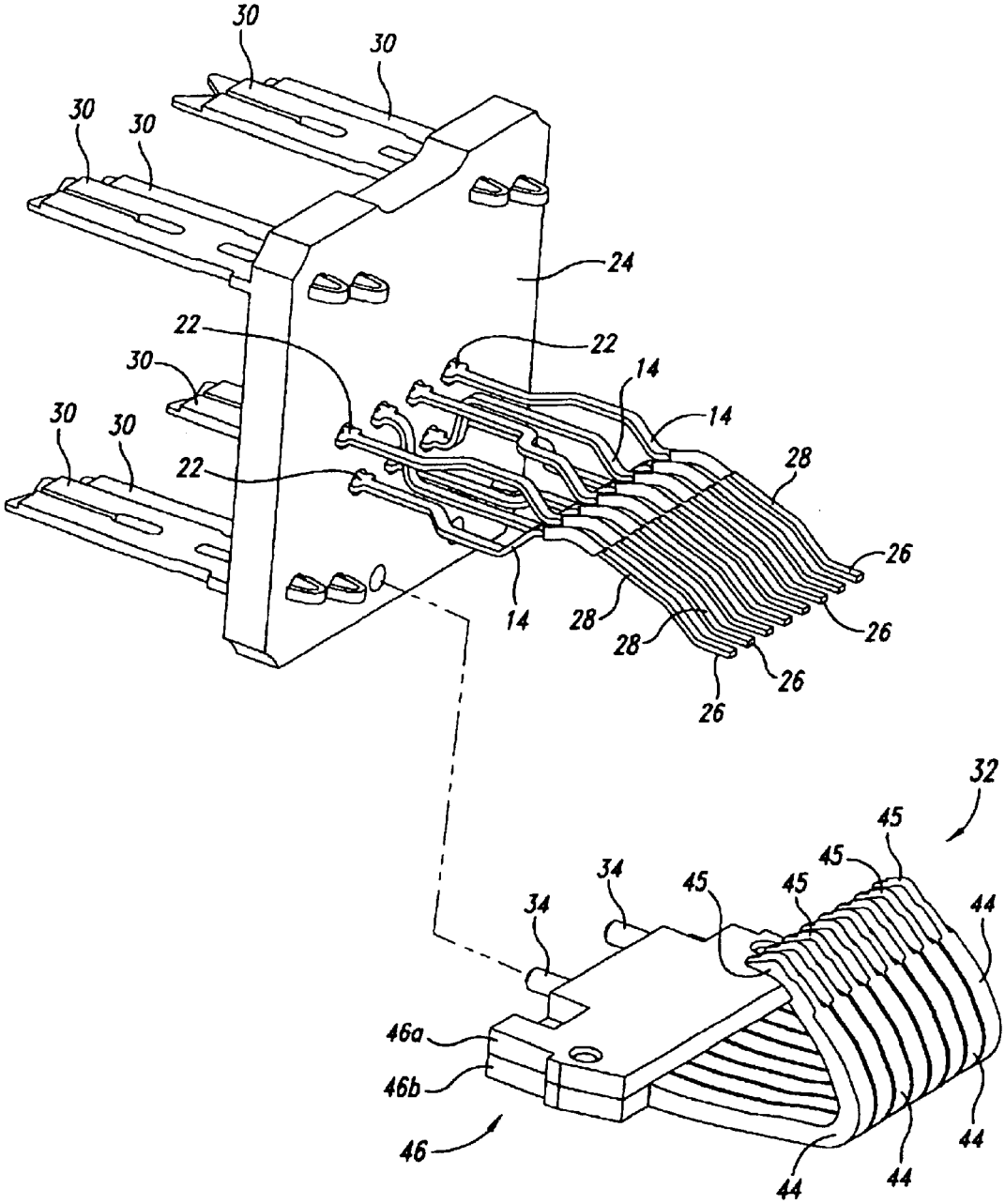
FIG. 2 is an exploded isometric view of the electrical connector jack shown in FIG. 1 with the spring assembly separated from the circuit board and without the connector body.
Figure 3:
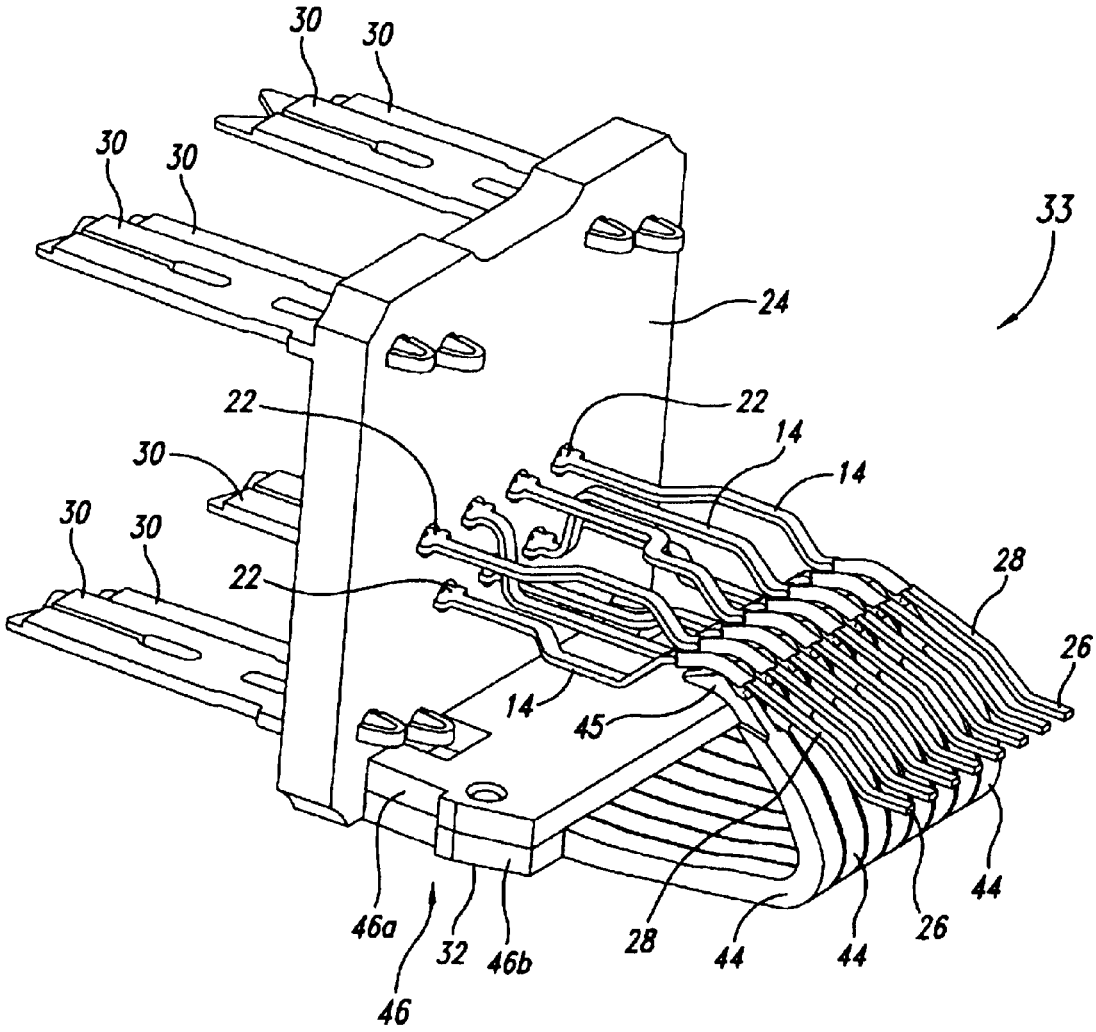
FIG. 3 is an isometric view of the electrical connector jack assembly shown in FIG. 2 with the spring assembly shown mounted to the circuit board but still without the connector body.

As shown in FIGS. 2 and 3, the tines 14 each have a first end portion 22 fixedly attached to a printed circuit board 24 and have a second free end portion 26. Each tine 14 has a contact portion 28 extending between its first and second end portions 22 and 26. As will be discussed below, the contact portions 28 are arranged in the body 12 to be contacted by the contacts 20 of the plug 18 when inserted into the receptacle 16. The contact portions 28 of the tines 14 are in a generally parallel arrangement and the tines are essentially allowed to "float" as simple cantilevered beams. The printed circuit board 24 also supports eight insulation displacement contacts (IDCs) 30, each being electrically connected through the circuit paths on the printed circuit board to one of the eight tines 14. Wires carrying electrical signals may be connected to the IDCs 30 in a conventional manner. Other style contacts and means may be used to electrically connect signals to the tines 14. In the illustrated embodiment of the connector jack 10, the IDCs 30 are pressed into place in apertures in the printed circuit board 24, and the first end portions 22 of the tines 14 are first pressed into place in apertures in the printed circuit board and then soldered.

Figure 4:
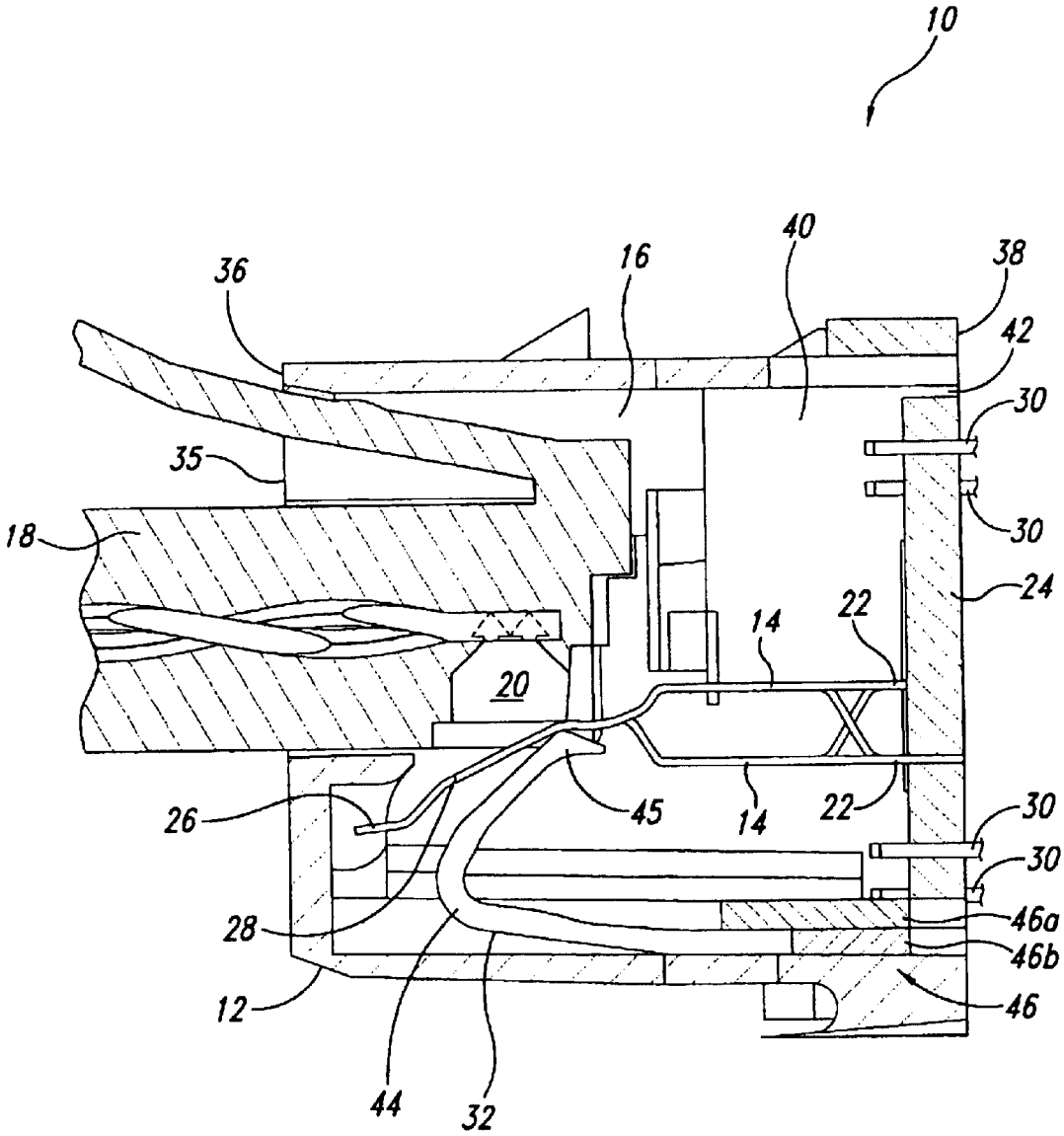
FIG. 4 is a cross-sectional view of the electrical connector jack shown in FIG. 1.

When the printed circuit board 24 has the tines 14 and the IDCs 30 attached, a spring assembly 32 is mounted to the printed circuit board 24 in position below the tines as shown in FIG. 3. As best seen in FIG. 2, the spring assembly 32 has a pair of protrusions 34 which are inserted into apertures in the printed circuit board. The printed circuit board assembly, indicated by reference numeral 33 is shown in FIG. 3 ready for positioning within the body 12 of the connector jack 10, as is illustrated in FIG. 4.

The receptacle 16 of the body 12 has a forward facing opening 35 in a forward end 36 of the body 12 which is sized to pass the plug 18 therethrough as it is inserted into the receptacle. As shown in FIG. 4, a rearward end 38 of the body 12 has a chamber 40 with a rearward facing opening 42 sized to receive the assembled printed circuit board 24 therein. The printed circuit board 24 is positioned adjacent to the receptacle 16 with the tines 14 projecting forward into the receptacle in position for the contact portions 28 thereof to be contacted by the contacts 20 of the plug 18 when inserted into the receptacle to make electrical contact therewith. A carrier or terminal block 43, shown in FIG. 1, is mounted at and covers the rearward facing opening 42 of the chamber 40, and captures and holds the printed circuit board 24 in place. Snaps securely connect the terminal block 43 to the body 12. The terminal block 43 has apertures to allow access to the IDCs 30 which project rearward from the printed circuit board 24 to allow connection of wires thereto.

The tines 14 are laterally spaced apart so that one tine is contacted by a correspondingly positioned one of the plug contacts 20 when the plug 18 is inserted into the receptacle 16. The contact of the plug contacts 20 with the tines 14 moves the contacted tines in a generally downward direction, with a small rearward component, as the tines flex downward in response thereto. Each of the tines 14 is sufficiently resilient to produce a first generally upward force on the tine against the corresponding plug contact 20 in response thereto. This serves as a contact force between the tine and the plug contact to help provide good electrical contact. However, as discussed above, it is desirable to keep the tines 14 as short as possible to improve electrical performance of the jack, while still providing sufficient resiliency to accommodate legacy plugs and the contact force needed to meet the FCC standards. To do so, the spring assembly 32 is positioned below the tines 14, as best seen in FIG. 4, to provide increased contact force and resiliency than the tines alone can produce in response to the tines moving downward as the plug 18 is inserted into the receptacle 16, without requiring the tines to be longer than desired to provide good electrical performance. The increased resiliency allows the insertion of legacy plugs into the receptacle 16 and the resulting extreme flexure of the tines 14 that can result, without permanent deformation of the tines.

The spring assembly 32 includes eight resilient, non-conductive spring arms 44, each positioned immediately under a correspondingly positioned one of the tines 14. A head portion 45 of each spring arm 44 is in contact with an underside of the tine opposite the side of the tine contacted by the plug contact 20. The spring arms 44 extend forward from a spring assembly base 46, with a slight upward slant, and have a knee bend whereat the spring arms project generally upward and rearward and terminate in a free end portion including the head portion 45. Each of the spring arms 44 is positioned to have the head portion 45 thereof engaged by and move downward with the correspondingly positioned tine 14 as the tine moves downward when the plug 18 is inserted into the receptacle 16. The spring arm head portion 45 moves downward with a small rearward component since the tine deflects with an arcuate movement.

The spring arms are 44 laterally separated from each other by a small distance. As such, each of the spring arms 44 is independently movable relative to the other ones of the spring arms, and each spring arm provides a second generally upward force on the correspondingly positioned tine which is transmitted to the plug contact 20 contacting the tine. This creates a supplemental upward force that causes an increased contact force between the tine and the plug contact (generally the sum of the first and second upward forces). The supplemental upward force also causes the tine to respond as if having greater resiliency than experienced by the unassisted tine, and assists the return movement of the tine when the plug 18 is removed from the receptacle 16 and allowed to return from its deflected position to its original position before the plug was inserted into the receptacle. This improvement in mechanical performance is accomplished without the need to lengthen and thicken the tines 14 to achieve it and thereby degrade electrical performance of the jack. Also, since each spring arm 44 operates on the tine 14 it engages independent of the other spring arms, the same characteristics of increased contact force and tine resiliency are experienced by a tine whether one tine or all eight tines are being engaged by plug contacts 20. This provides consistent performance characteristics for the jack 10.

The increased tine resiliency improves the ability of the jack 10 to handle legacy plugs having substantially different sizes and styles than a Category 6 plug, when inserted into the receptacle 16 by allowing an increased range of elastic deflection without undesirable permanent deformation of the tines 14. The independent operation of the spring arms 44 allows the use of legacy plugs of many configurations, size and number of plug contacts that cause some tines 14 to deflect by large amounts such as when engaged by sidewalls or other non-contact portions of the plug, while other tines do not and still producing good electrical contact with the contacts of the legacy plug and without damage to the tines. Again, the increased resiliency is accomplished without the need to lengthen and thicken the tines to achieve it.

Rails inside the body 12 align and hold the spring arms 44 in position for contact with the plug contacts 20. The body also includes features to capture the tines 14.

The spring assembly 32 is manufactured of a non-conductive plastic, thus the spring arms 44 can directly contact the metal tines without requiring insulation or causing an electrical problem. The plastic is selected to provide a good life cycle with low creep or cold flow characteristics.

Figure 5:
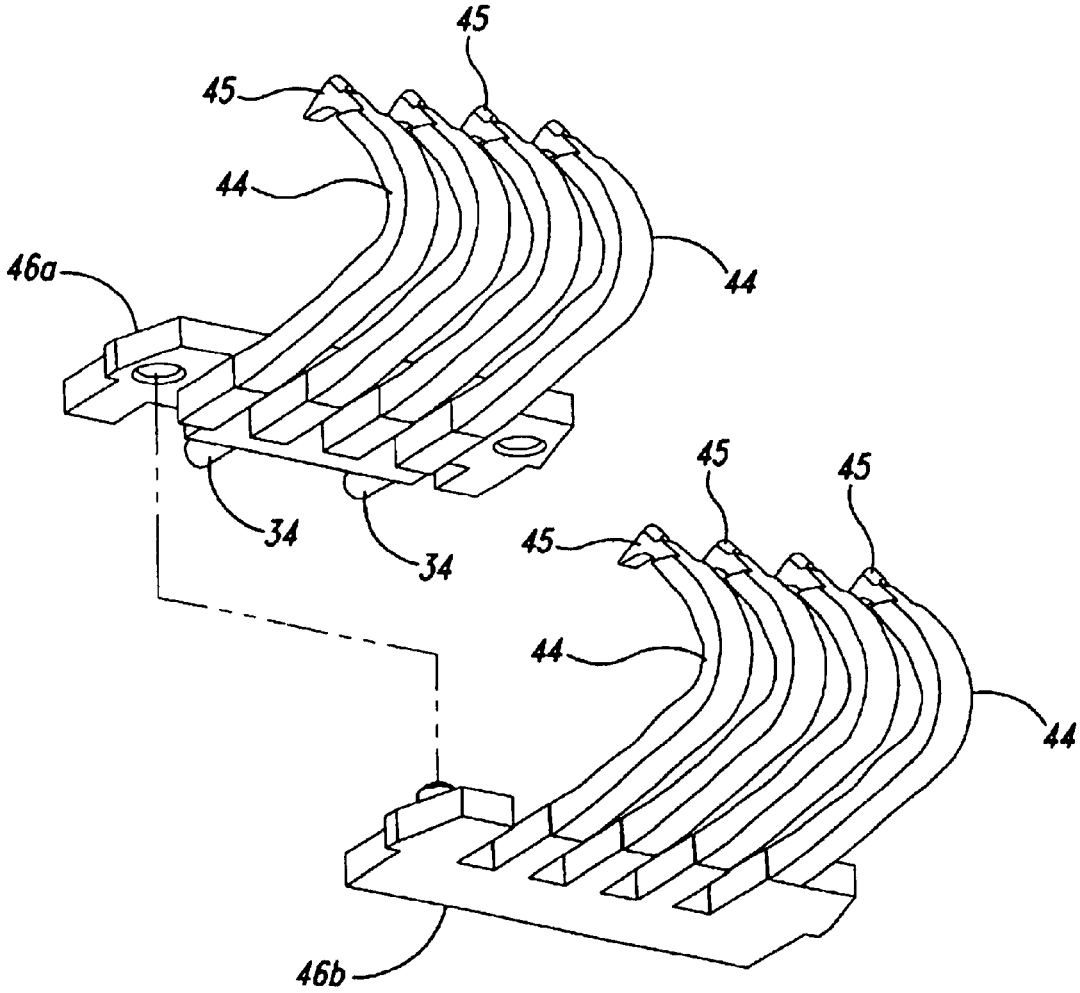
FIG. 5 is an exploded isometric view of the two separated components of the spring assembly used with the electrical connector jack shown in FIG. 1.

As best seen in FIGS. 2, 3 and 5, the spring assembly 32 is composed of two separately molded components for ease of manufacture. In particular, the first component includes a first portion 46a of the base 46 which has the pair of protrusions 34 which secure the spring assembly 32 to the printed circuit board 24, and has every other one of the eight spring arms 44 projecting therefrom. The second component includes a second portion 46b of the base 46, and has the other four of the eight spring arms 44 projecting therefrom. Adjacent spring arms of the first component are separated by slightly greater than the width of one of the spring arms of the second component, and adjacent spring arms of the second component are separated by slightly greater than the width of one of the spring arms of the first component. As such, when the first and second components of the spring assembly 32 are assembled together, with the spring arms of the first and second assemblies interleaved, there is a very small space between neighboring spring arms of the first and second assemblies which allows their independent movement.

An alternative method of achieving such closely spaced spring arms would be to injection mold the spring assembly 32 as one piece, but put thin blades of steel between each spring arm position in the mold cavity. This would cause the resulting eight spring arms to be closely spaced but yet independently movable.

While the present invention is illustrated and discussed with respect to a Category 6 jack, it should be understood that the invention is useful for many style jacks, including but not limited to Category 3, Category 5, Category 5e and other telecommunication and non-telecommunication jacks, and that the jacks need not utilize a printed circuit board mounting for the tines 14, spring assembly 32 or other components or utilize a printed circuit board at all.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A connector jack, usable with a plug having a plurality of plug contacts, the jack comprising:

a body having a receptacle sized and configured to receive the plug therein;

a circuit board positioned adjacent to the receptacle;

a plurality of contact tines, each having a first end fixedly attached to the circuit board, a second free end and a contact portion between the first and second ends, the tine contact portions being positioned within the receptacle to be contacted by a corresponding one of the plug contacts and moved in response thereto in a first direction as the plug is inserted into the receptacle, each tine being sufficiently resilient to produce a first force on the tine contact portion against the corresponding plug contact in response to having been moved in the first direction; and a plurality of resilient, non-conductive elongated spring arms, each having an independently movable spring member portion within the receptacle positioned adjacent to a corresponding one of the tine contact portions to be engaged by the corresponding tine contact portion when moved, in the first direction by the corresponding plug contact as the plug is inserted into the receptacle, each spring arm being configured for the spring member portion thereof to apply a second force on the corresponding tine contact portion against the corresponding plug contact in response to having been moved in the first direction to produce a contact force between the corresponding tine contact portion and plug contact substantially equal to the sum of the first and second forces and to assist return movement of the corresponding tine contact portion in a second direction opposite the first direction when the plug is removed from the receptacle.

2. A connector jack, usable with a plug having a plurality of plug contacts, the jack comprising:

a body having a receptacle sized and configured to receive the plug therein;

a circuit board;

a plurality of contact tines extending within the receptacle, each having a first end fixedly attached to the circuit board and a second free end, the contact tines being positioned within the receptacle to be contacted by a corresponding one of the plug contacts and moved in response thereto in a first direction as the plug is inserted into the receptacle, each contact tine being sufficiently resilient to produce a first contact force between the corresponding contact tine and plug contact in response to having been contacted and moved in the first direction by the corresponding plug contact; and a plurality of resilient, elongated spring members extending within the receptacle, each positioned adjacent to a corresponding one of the contact tines to be engaged by the corresponding contact tine when moved in the first direction by the corresponding plug contact as the plug is inserted into the receptacle, each spring member being configured to apply a force on the corresponding contact tine to produce a second contact force between the corresponding contact tine and plug contact in addition to the first contact force in response to the corresponding contact tine having been contacted and moved in the first direction by the corresponding plug contact.

3. A connector jack, usable with a plug having a plurality of plug contacts, the jack comprising:

a body having a receptacle sized and configured to receive the plug therein;

a circuit board;

a plurality of contact tines, each having a first end fixedly attached to the circuit board, a second free end and a contact portion between the first and second ends, the contact portions each having a first side and an opposite second side, the contact tines extending within the receptacle and positioned for the first sides of the contact portions to be engaged by correspondingly positioned ones of the plug contacts to move the engaged contact tines in a first generally transverse direction when the plug is inserted into the receptacle, each contact tine being sufficiently resilient to produce a first force in a second direction opposite the first direction against the correspondingly positioned plug contact in response to being moved by the plug contact; and a plurality of resilient spring members extending within the receptacle, each being adjacent to the second side of the contact portion of a correspondingly positioned one of the contact tines in position to be engaged thereby when the correspondingly positioned contact tine is moved in the first direction by the correspondingly positioned plug contact when the plug is inserted into the receptacle, the spring members each being configured to apply a second force against the correspondingly positioned contact tine in the second direction to produce a contact force between the engaged correspondingly positioned contact tine and the plug contact substantially equal to the sum of the first and second forces and to assist return movement of the engaged correspondingly positioned contact tine in the second direction when the plug is removed from the receptacle.

4. A connector jack, usable with a plug having a plurality of plug contacts, the jack comprising:

a body having a receptacle sized and configured to receive the plug therein;

a plurality of contact tines, each with at least a portion thereof positioned within the receptacle to be contacted by a corresponding one of the plug contacts and moved in response thereto in a first direction as the plug is inserted into the receptacle, each contact tine being sufficiently resilient to produce a first contact force between the corresponding contact tine and plug contact in response to having been contacted and moved by the corresponding plug contact; and a plurality of resilient spring members, each with at least a portion thereof positioned within the receptacle adjacent to a corresponding one of the contact tines to be engaged by the corresponding contact tine when moved in the first direction by the corresponding plug contact as the plug is inserted into the receptacle, each spring member being configured to apply a force on the corresponding contact tine to produce a second contact force between the corresponding contact tine and plug contact in addition to the first contact force in response to the corresponding contact tine having been contacted and moved in the first direction by the corresponding plug contact.

5. The connector jack of claim 4 wherein each of the contact tines has a first end supported by a support member, a second free end and a contact portion between the first and second ends positioned to be contacted by a corresponding one of the plug contacts.

6. A connector jack, usable with a plug having a plurality of plug contacts, the jack comprising:

a body having a receptacle sized and configured to receive the plug therein;

a plurality of contact tines extending within the receptacle with each in position for contact by a corresponding one of the plug contacts and movement in response thereto from a first position to a second position when the plug is in the receptacle; and a plurality of resilient spring members extending within the receptacle and positioned adjacent to a corresponding one of the contact tines to be engaged by the corresponding contact tine when moved from the first position to the second position by the corresponding plug contact when the plug is in the receptacle, each spring member being configured to apply a force against the corresponding contact tine in a direction from the second position toward the first-position to produce a contact force between the corresponding contact tine and plug contact when the plug is in the receptacle.

7. The connector jack of claim 6 wherein each of the contact tines has a first end supported by a support member, a second free end and a contact portion between the first and second ends positioned to be contacted by a corresponding one of the plug contacts.

8. The connector jack of claim 6 wherein each spring member is configured to apply the force against the corresponding contact tine when the corresponding contact tine is in the second position in a sufficient amount to at least assist in moving the corresponding contact tine to the first position when the plug is removed from the receptacle.

9. A connector jack, usable with a plug having a plurality of plug contacts, the jack comprising:

a body having a receptacle sized and configured to receive the plug therein;

a plurality of contact tines, each having a first side and an opposite second side, the first side of each contact tine having a contact portion within the receptacle positioned to be engaged by a correspondingly positioned one of the plug contacts when the plug is inserted into the receptacle; and a plurality of resilient spring members, each positioned adjacent to the second side of a correspondingly positioned one of the contact tines, whereby the spring members corresponding to the contact tines engaged by the correspondingly positioned plug contacts each apply a reaction force to the corresponding engaged contact tine to generate a contact force between the corresponding engaged contact tine and the correspondingly positioned plug contact.

10. The connector jack of claim 9 wherein each of the contact tines has a first end supported by a support member and a second free end with the contact portion located between the first and second ends in a position to be engaged by the correspondingly positioned one of the plug contacts when the plug is inserted into the receptacle.

11. The connector jack of claim 9 wherein the spring members each have at least a portion positioned within the receptacle and adjacent to the second side of the correspondingly positioned one of the contact tines, whereby the spring member portions corresponding to the contact tines engaged by the correspondingly positioned plug contacts each apply the reaction force to the corresponding engaged contact tine to generate the contact force between the corresponding engaged contact tine and the correspondingly positioned plug contact.

12. A connector jack, usable with a plug having a plurality of plug contacts, the jack comprising:

a body having a receptacle sized and configured to receive the plug therein;

a plurality of contact tines, each having a contact portion within the receptacle positioned to be engaged by a correspondingly positioned [ones] *one* of the plug contacts when the plug is inserted into the receptacle; and a plurality of resilient spring members, each configured to apply a reaction force to one of the contact tines when engaged by the correspondingly positioned plug contact in a direction to generate a supplemental contact force between the contact tine and the correspondingly positioned plug contact.

13. The connector jack of claim 12 wherein each of the contact tines has a first end supported by a support member and a second free end with the contact portion located between the first and second ends in a position to be engaged by the correspondingly positioned one of the plug contacts when the plug is inserted into the receptacle.

*14. A connector jack, usable with a plug having a plurality of plug contacts, the jack comprising:*

*a body having a receptacle sized and configured to receive the plug therein;*

*a plurality of contacts, each having a contact portion within the receptacle positioned to be engaged by a correspondingly positioned one of the plug contacts when the plug is inserted into the receptacle; and*

*a plurality of resilient spring members, each configured to apply a reaction force to one of the contacts when engaged by the correspondingly positioned plug contact in a direction to generate a contact force between the contact member and the correspondingly positioned plug contact.*

*15. The connector jack of claim 14 wherein the contact portion of each of the plurality of contacts has a substantially flat side positioned to be engaged by the correspondingly positioned one of the plug contacts when the plug is inserted into the receptacle.*

*16. The connector jack of claim 14 wherein each of the resilient spring members comprises a nonconductive spring arm.*

*17. A connector jack, usable with a plug having at least one plug contact, the jack comprising:*

*a body having a receptacle sized and configured to receive the plug therein;*

*at least one electrical conductor having a contact portion within the receptacle positioned to be engaged by the at least one plug contact when the plug is inserted into the receptacle; and*

*a resilient spring member configured to apply a reaction force to the at least one electrical conductor when engaged by the at least one plug contact in a*

*direction to generate a contact force between the at least one electrical conductor and the at least one plug contact.*

*18. The connector jack of claim 17 wherein the contact portion of the at least one electrical conductor has a substantially flat side positioned to be engaged by the at least one plug contact when the plug is inserted into the receptacle.*

*19. The connector jack of claim 17 wherein the resilient spring member comprises a nonconductive spring arm.*

*20. A connector jack, usable with a plug having a plurality of plug contacts, the jack comprising:*

*a body having a receptacle sized and configured to receive the plug therein;*

*a plurality of electrical conductors to be engaged by correspondingly positioned ones of the plug contacts when the plug is inserted into the receptacle; and*

*a plurality of resilient spring members, each configured to apply a reaction force to one of the electrical conductors when engaged by the correspondingly positioned plug contact in a direction to generate a contact force between the electrical conductor and the correspondingly positioned plug contact.*

*21. The connector jack of claim 20 wherein each of the plurality of electrical conductors comprises a contact portion to be engaged by the correspondingly positioned plug contact when the plug is inserted into the receptacle, the contact portion having a substantially rectangular cross-sectional shape.*

*22. The connector jack of claim 20 wherein each of the plurality of electrical conductors has a substantially flat side positioned to be engaged by the correspondingly positioned plug contact when the plug is inserted into the receptacle.*

*23. The connector jack of claim 20 wherein the plurality of resilient spring members comprises a nonconductive spring arm.*

*24. A connector jack, usable with a plug having a plurality of plug contacts, the jack comprising:*

*a body having a receptacle sized and configured to receive the plug therein;*

*a plurality of contact members extending within the receptacle with each in position for contact by a corresponding one of the plug contacts when the plug is in the receptacle; and*

*a plurality of resilient spring members extending within the receptacle and positioned adjacent to a corresponding one of the contact members to be engaged by the corresponding contact member when contacted by the corresponding plug contact when the plug is in the receptacle, each spring member being configured to apply a force against the corresponding contact member to produce a contact force between the corresponding contact member and plug contact when the plug is in the receptacle.*

*25. A connector jack, usable with a plug having a plurality of plug contacts, the jack comprising:*

*a body having a receptacle sized and configured to receive the plug therein;*

*a plurality of contact members, each having a first side and an opposite second side, the first side of each contact tine having a contact portion within the receptacle positioned to be engaged by a correspondingly positioned one of the plug contacts when the plug is inserted into the receptacle; and*

*a plurality of resilient spring members, each positioned adjacent to the second side of a correspondingly positioned one of the contact members, whereby the spring members corresponding to the contact members engaged by the correspondingly positioned plug contacts each apply a reaction force to the correspondingly engaged contact member to generate a contact force between the*

*correspondingly engaged contact member and the correspondingly positioned plug contact.*

*26. A method of connecting a plug having a plurality of plug contacts to a connector jack, comprising:*

*inserting the plug into a body having a receptacle sized and configured to receive the plug therein;*

*bringing the plurality of plug contacts into electrical engagement with a corresponding plurality of electrical contacts positioned within the receptacle when the plug is inserted into the receptacle; and*

*applying, through a plurality of resilient spring members positioned within the receptacle in proximity with the plurality of electrical contacts, a force to one of the electrical contacts when engaged by the correspondingly positioned plug contact to thereby generate a contact force between the electrical contact and the correspondingly positioned plug contact.*

*27. The method of claim 26 wherein the plurality of electrical contacts positioned within the receptacle are posi-*

*tioned within the receptacle intermediate the plug contacts and the resilient spring members when the plug contacts are brought into electrical contact with the plurality of electrical contacts within the receptacle.*

*28. A method of connecting a plug having a plurality of plug contacts to a connector jack, comprising:*

*inserting the plug into a body having a receptacle sized and configured to receive the plug therein;*

*bringing the plurality of plug contacts into electrical engagement with a corresponding plurality of electrical contacts positioned within the receptacle when the plug is inserted into the receptacle; and*

*deflecting a plurality of resilient spring members positioned in proximity with the plurality of electrical contacts to thereby generate a reaction force on the electrical contacts when engaged by the corresponding plug contacts.*

*29. A method of connecting a plug having at least one plug contact to a connector jack, comprising:*

*inserting the plug into a body having a receptacle sized and configured to receive the plug therein;*

*bringing the at least one plug contact into electrical engagement with at least one electrical contact positioned within the receptacle when the plug is inserted into the receptacle; and*

*deflecting at least one resilient spring member in proximity with the at least one electrical contact to thereby generate a reaction force on the at least one electrical contact in a direction toward the at least one plug contact when engaged by the at least one plug contact.*

*30. The method of claim 29 wherein the at least one electrical contact is positioned within the receptacle intermediate the at least one plug contact and the at least one resilient spring member when the at least one plug contact is brought into electrical contact with the at least one electrical contact.*

* * * * *